United States Patent [19]

Lammers et al.

[11] Patent Number: 5,264,855
[45] Date of Patent: Nov. 23, 1993

[54] TECHNIQUE FOR STATIONARY RADAR TARGET DISCRIMINATION

[75] Inventors: Uve H. W. Lammers, Chelmsford; Richard A. Marr, Billerica, both of Mass.

[73] Assignee: The United States of America as represented by the Secretary of the Air Force, Washington, D.C.

[21] Appl. No.: 15,503

[22] Filed: Feb. 9, 1993

[51] Int. Cl.$^5$ .............................................. G01S 13/00
[52] U.S. Cl. .................................... 342/159; 342/165
[58] Field of Search ............... 342/165, 173, 159, 160

[56] References Cited

U.S. PATENT DOCUMENTS 4,380,807  4/1983  Reynard .............................. 367/97

OTHER PUBLICATIONS

Skolnik, M. I.; "Introduction to Radar Systems" 1980, pp. 101–107.

Primary Examiner—Mark Hellner
Attorney, Agent, or Firm—Donald J. Singer; Irwin P. Garfinkle

[57] ABSTRACT

The disclosure describes a method of measuring stationary CW radar targets in the presence of sizable clutter and leakage signals, and to eliminate the clutter and leakage by taking a first measurement when the target is in a first position, and taking a second measurement when the target is translated to a second position such that the target signal pathlength changes by ½ wavelength from the first position, and then subtracting the first and second measurement to eliminate the unwanted clutter and leakage.

12 Claims, 3 Drawing Sheets

TECHNIQUE FOR STATIONARY RADAR TARGET DISCRIMINATION

STATEMENT OF GOVERNMENT INTEREST

The invention described herein may be manufactured and used by or for the Government for governmental purposes without the payment of any royalty thereon.

FIELD OF THE INVENTION

This invention is in the field of CW radar and its objective is to make possible the measurement of a small stationary target in the presence of sizable clutter and leakage signals. CW radar is conveniently used in the laboratory to measure backscatter and bistatic scatter cross-sections of stationary targets. Lacking range resolution, the simplicity of a CW system is somewhat offset by the sophistication required in suppressing stationary background signals (i.e. clutter echoes from objects other than the target) and in cancelling leakage signals (i.e. signals reaching the receiver without reflection from the target or background). This invention makes possible the measurement of small stationary radar targets in the presence of sizable clutter and leakage signals by providing a method for cancelling clutter and leakage signals.

BACKGROUND OF THE INVENTION

In a typical CW radar cross-section measurement range, the target signal competes with the background signal, from which it cannot be distinguished. Depending on the minimum radar signal to be measured, it is therefore necessary to make the target background of low reflectivity. This is achieved either by radar absorbent material in an anechoic chamber or by free space. Radar absorbent material of low reflectivity over a wide range of frequencies and reflection angles is difficult to make. Free space is often inconvenient or impractical for a target background.

Likewise, the target signal cannot be distinguished from a leakage signal travelling directly between transmitter and receiver. In a CW radar which uses the same antenna for transmission and reception, separating the received signal from the leaked transmit signal generally involves careful cancellation of the leakage signal with another signal of equal amplitude and opposite phase. Cancellation between the two signals is affected by frequency drift of the transmit source and by thermal change of path lengths inside the radar, and therefore, it is difficult to maintain perfect cancellation over extended time periods. If separate antennas are used for transmission and reception in backscatter and bistatic systems, there is usually coupling between antenna sidelobes. The signal received on this path also requires cancellation.

This invention will allow one to measure a CW radar signal scattered from a stationary target in the presence of large background clutter and leakage signals without a need to reduce these signals to a level small compared with the target signal. The invention has some similarity to a single delay canceller in a moving target indication (MTI) radar, as described in the Radar Handbook, Chapter 17, McGraw Hill, 1970, M. I. Skolnik, Editor. The single delay MTI canceller subtracts the echoes of a first pulse received by a stationary pulse radar from the echoes of a second pulse received one over the pulse repetition frequency later. The echoes of the first pulse are delayed by exactly the inverse of the pulse repetition frequency in a radar-internal delay line before subtraction. Clutter signals, such as received from background terrain, are identical in both pulses and subtract out. Echoes from moving targets except for those that have moved an integral numbers of half radar wavelengths toward or away from the radar between two pulses do not subtract out. Substantial sub-clutter visibility of moving targets is thus achieved by an MTI radar.

OBJECTS OF THE INVENTION

It is an object of this invention to provide a method of measuring small stationary radar targets in the presence of sizable clutter and leakage signals.

Another object is to provide a method of measuring small stationary CW radar targets in the presence of sizable clutter and leakage signals.

Still another object of this invention is to provide a method of measuring small stationary CW radar targets in the presence of sizable clutter and leakage signals, and to eliminate the clutter and leakage by taking a first measurement when the target is in a first position, and taking a second measurement when the target is translated to a second position, and then subtracting the first and second measurement.

A more specific object of this invention is to provide a method of measuring small stationary CW radar targets in the presence of sizable clutter and leakage signals, and to eliminate the clutter and leakage by taking a first measurement when the target is in a first position, and taking a second measurement when the target is translated to a second position such that the target signal pathlength changes by ¼ wavelength from the first position, and then subtracting the first and second measurement.

Another object of this invention is to cancel unwanted signals by taking a first measurement which includes wanted and unwanted signals, and then taking a second measurement of the signals with the phase of the wanted signal shifted, and then subtracting the first measurement from the second.

Yet another object of this invention is to cancel unwanted signals by taking a first measurement which includes wanted and unwanted signals, and then taking a second measurement of the signals with the phase of the wanted signal shifted by 180 degrees, and then subtracting the first measurement from the second.

SUMMARY OF THE INVENTION

This invention is for a method of measuring small stationary CW radar targets in the presence of sizable clutter and leakage signals. The clutter is eliminated by taking a first measurement when the target is in a first position, and taking a second measurement when the target is translated to a second position such that the target signal pathlength changes by ¼ wavelength from the first position, and then subtracting the first and second measurement to eliminate the unwanted clutter and leakage.

BRIEF DESCRIPTION OF THE DRAWINGS

The foregoing and other objects and advantages of the invention will be apparent from the following description of the preferred embodiment of the invention, as illustrated in the accompanying drawings, in which like reference characters refer to the same parts throughout the different species, and in which.

DETAILED DESCRIPTION OF AN ILLUSTRATIVE EMBODIMENT

Figure 1A:
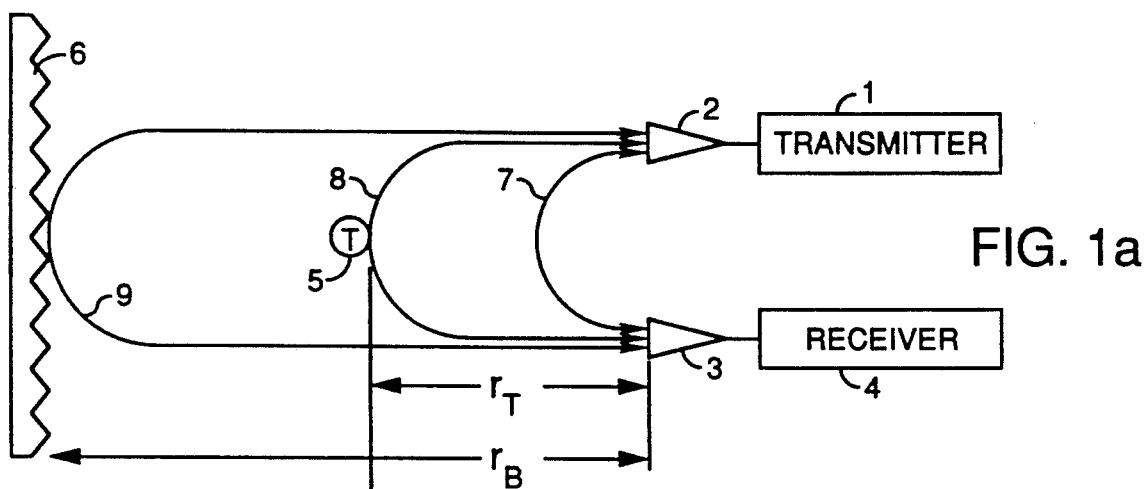
FIGS. 1a and 1b show the basic configuration of a CW radar system for backscatter cross-sectional measurement of radar targets.
Figure 1B:
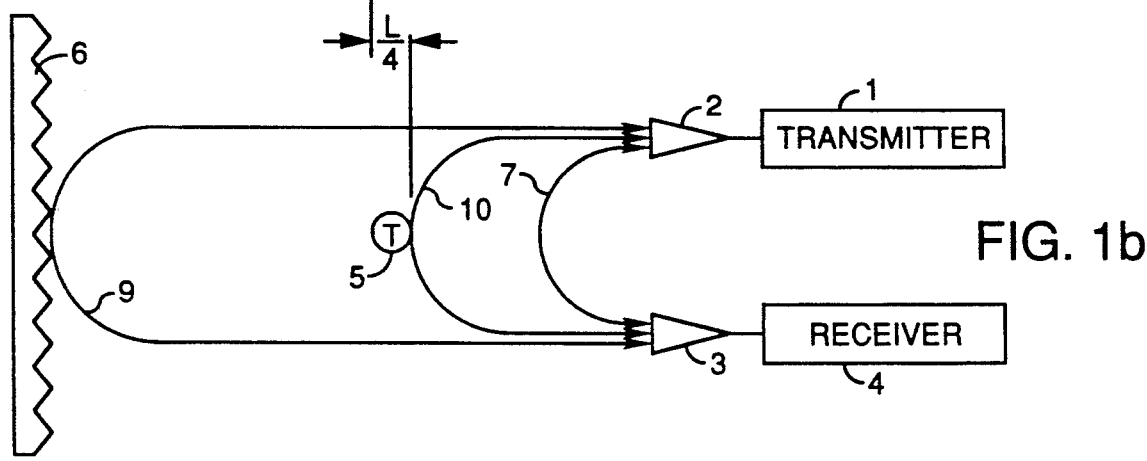

The basic configuration of a CW radar system for backscatter cross-section measurement is shown in FIGS. 1a and 1b to which reference is now made. While separate antennas are assumed for transmission and reception, it will be understood that the same principles apply to a single-antenna radar in which a single antenna is used for both transmitting and receiving.

The system includes a transmitter 1 which transmits a CW signal from a transmitting antenna 2 toward a target 5 and toward background material 6, which is an imperfect radar absorbent material. The system also includes a receiver 4 which receives three types of signals from its receiving antenna 3. The first type is a leakage signal 7 symbolized by sidelobe coupling between the antennas 2 and 3. The signal 7 represents other internal sources of leakage as well, such as the diplexer in a single-antenna system. The second signal 8 is from target 5 at a range $r_T$, and the third signal 9 is from the background material 6 at a range $r_B$. Both are received simultaneously with the leakage signal 7, which is assumed to come from a zero range. Note, that the target and background signals may include components that originate at multiple ranges, but this is of no consequence to this invention.

Figure 2A:
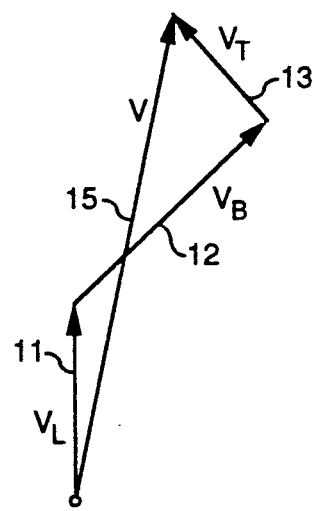
FIGS. 2a and 2b show the vector diagrams of the signals received by the receiver in FIGS. 1a and 1b.
Figure 2B:
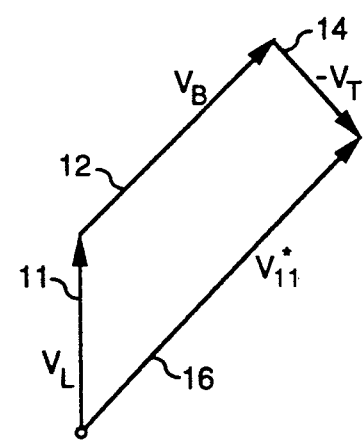

Receiver 4 receives a vector sum V of the leakage signal $V_L$, signal $V_B$, and the target signal $V_T$, as shown in FIG. 2a. The receiver 4 cannot extract the target signal $V_T$ from the sum without a second measurement according to FIG. 1b. In FIG. 1b, the target is moved one quarter wavelength (L/4) toward the radar. As shown in FIG. 1b, the target path length 10 is now ½ wavelength shorter than the target path length 8 in FIG. 1a. With identical results, the target could be moved a quarter wavelength away from the radar for a path length of ½ wavelength longer. Assuming that the range $r_T$ to the target 5 is much greater than L/4, the target signal magnitude changes insignificantly between the positions shown in FIGS. 1a and 1b. Only the phase has been shifted by 180°. FIG. 2b is the resultant vector diagram. Subtraction of the two vectors leads to:

$$V - V^* = V_L + V_b + V_T - V_L - (-)V_T + 2V_T,$$

where $V$ is the resultant vector of FIG. 2a;
$V^*$ is the resultant vector of FIG. 2b;
$V_L$ is the leakage signal vector 11 in FIG. 2a.
$V_B$ is the background signal vector 12 in FIG. 2a.
$V_T$ is the target signal vector 13 in FIG. 2a.
$V_L$ is the leakage signal vector 11 in FIG. 2b.
$V_B$ is the background signal vector 12 in FIG. 2b.
$(-)V_T$ is the target signal vector 14 in FIG. 2b.

To the extent that the two measurements can be made in sequence fast enough for $V_L$ and $V_B$ to be stable, substantial suppression of these undesired signals is achieved. With little optimization, 50db suppression has been demonstrated experimentally in a 140GHz radar. Precautions must be taken so that $V_L$ and/or $V_B$ do not exceed the dynamic range of the radar receiver, although $V_T$ may be small. The requirement for a 180 degree phase shift of $V_T$ between the two measurements is not critical. An angle different from 180 degrees only leads to a phasor sum of less than maximum magnitude. As the phase change approaches zero or 360 degrees, the target signal cancels just like the leakage and background signals. The system works optimally with a target displacement of $+/-(2n-1)L/4$, where n is an integer. Since the target translation required to achieve cancellation of leakage and background signals is radial with respect to the radar, individual scattering centers on a complex target move identically with respect to the radar. This keeps the phasor sum constituting $V_T$ constant except for the 180 degree intended phase shift.

Figure 3A:
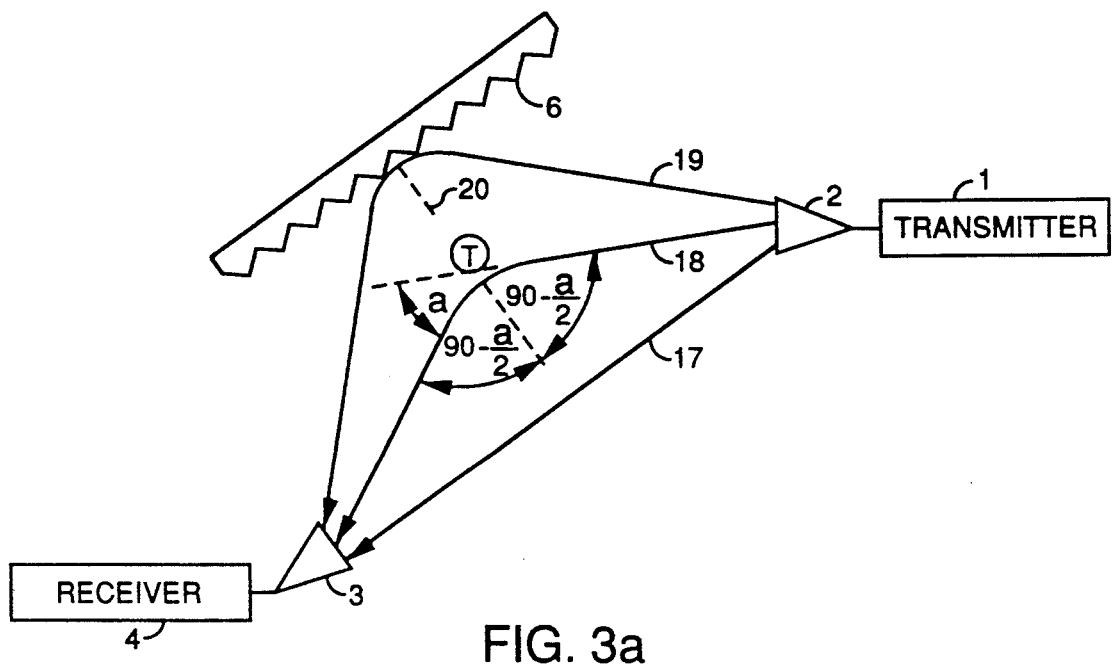
FIGS. 3a and 3b represent the situation for a bistatic radar corresponding to the backscatter radar in FIG. 1.
Figure 3B:
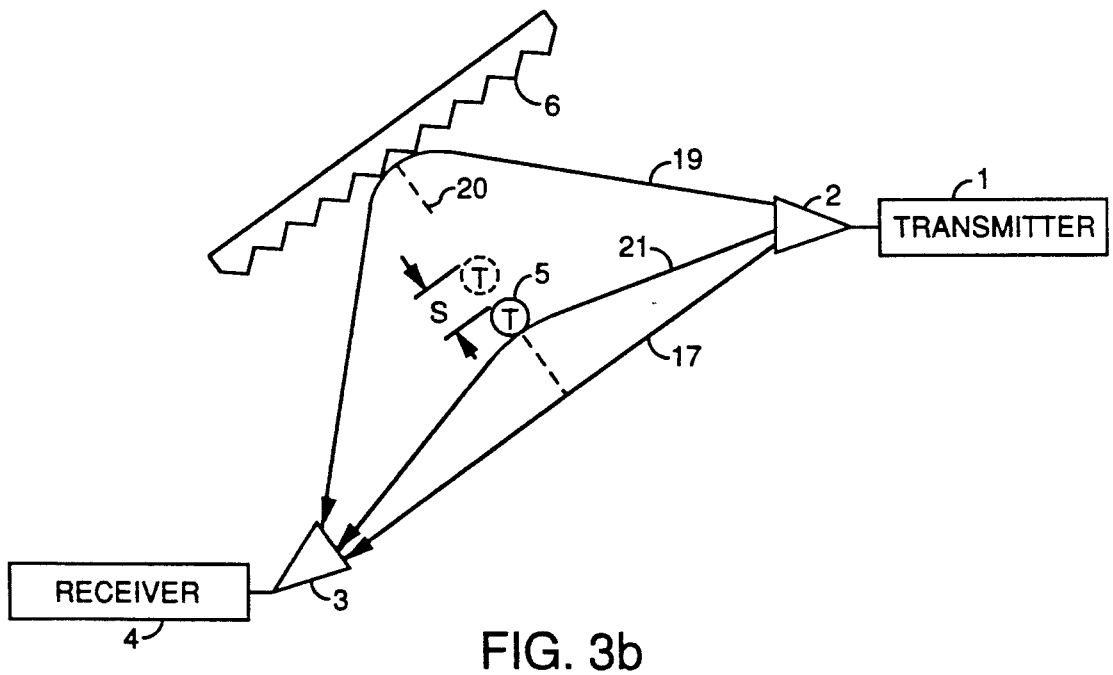

FIGS. 3a and 3b represent the situation for a bistatic radar corresponding to the backscatter radar in FIG. 1. The forward scatter angle a in FIG. 3a is measured between the transmit and receive portions of target signal path 18. Leakage signal path 17 and background signal path 19 symbolize the signal components $V_L$ and $V_B$ competing with the target signal $V_T$. To achieve an L/2 increase or decrease in the target signal path length 18 for the subtraction of the two vector sums as in FIG. 2 before, the target is best moved along the bisector 20. Isophase surfaces are ellipsoids of revolution with foci at the phase centers of antennas 2 and 3. Target motion along bisector 20, which is normal to these isophase surfaces achieves maximum phase shift with minimum target displacement. This is important, since target displacement along bisector 20 involves a change in the bistatic geometry. As in the backscatter radar case, some change in target signal between the two measurements is acceptable and does not affect the cancellation process. The penalty is a reduction in target signal magnitude. FIG. 3b shows the target displaced by a distance s so that target signal path length 21 is shorter than path length 18 in FIG. 3a by L/2. The displacement necessary is:

$$s = [(r/(\cos a/2) - L/4)^2 - r^2/4]^{1/2} + r/2 \tan a/2.$$

The displacement s is a function of antenna separation r, scatter angle a, and wavelength L. Although a displacement along the bisector is preferred for the sake of minimum s, it requires a change of the direction of displacement with a change in the scattering angle a. If, for mechanical simplicity, the displacement is in a fixed direction as in the case of FIGS. 1a and 1b, then the change in target vector sum can be accounted for computationally.

Typically, a radar target consisting of multiple scattering centers will return a signal $V_T$, which is a phasor sum. Separation of the sum vector into its components is desirable and could be achieved, if individual scattering centers could be moved to change their target path length by L/2. The remainder of the scattering centers, being stationary, would become part of the background and cancel in the subtraction process. This is not possible with most targets, where the scattering centers are rigidly spaced relative to each other. It is possible with a conglomerate of physically disconnected individual targets, however.

Figure 4:
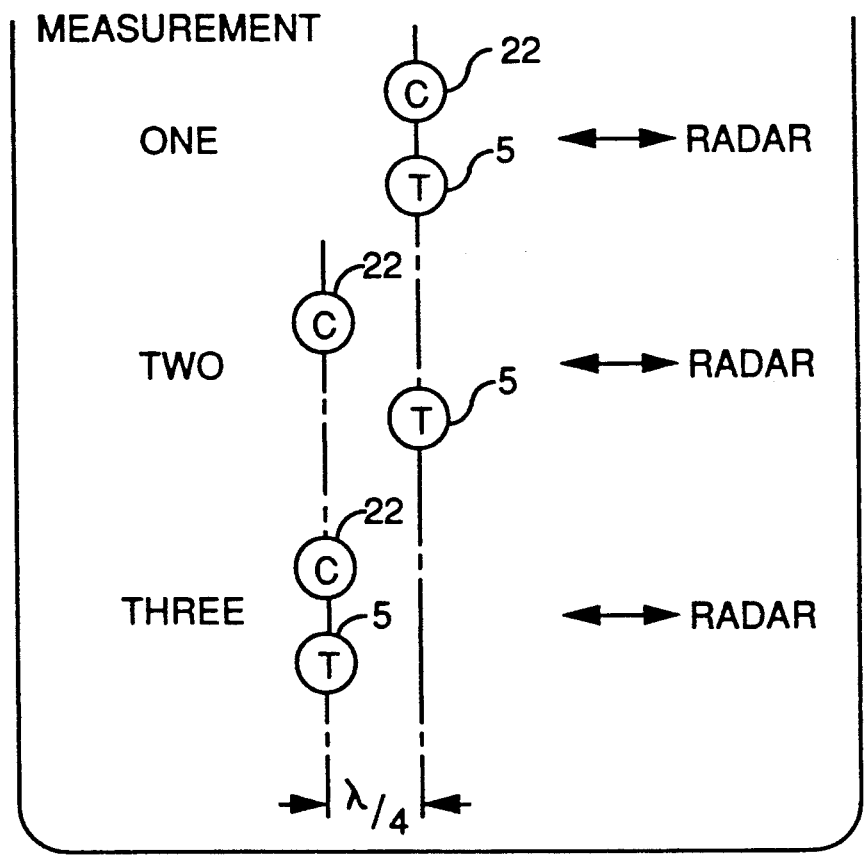
FIG. 4 shows the target displacement method of this invention, as in FIG. 1, when a calibration target of known characteristics is added.

As shown in FIG. 4, a practical case is that of a backscatter radar measuring a target under test and a calibration target. The calibration target, is a sphere or corner reflector of known scatter cross section. Both are mounted on separate translation stages and both are within the radar beam at all times. While the calibration target 22 and the test target 5 are at their initial positions, a first measurement is taken. After displacing the calibration target by a distance L/4, a second measurement is taken. After displacing the test target by the same distance L/4, a third measurement is taken. Displacements can be away from the radar as shown in FIG. 4, or toward it. Subtraction of the first measurement from the second measurement yields $V_{TC}$, the calibration target signal. Subtracting the second measurement from the third measurement yields $V_{TT}$, the target signal. Since the scatter cross section of the calibration target $S_C$ is known, the scatter cross section of the test target is:

$$S_T = S_C (V_{TT}/V_{TC})^2.$$

Again, it is assumed that the $V_{TT}$ and $V_{TC}$ measurements are taken in close temporal proximity, so that radar parameters such as transmit power and receiver gain are stable. Only the voltage ratio enters into the determination of $S_T$, making slow changes in radar parameters inconsequential.

Cross-range imaging of a target containing multiple scattering centers is accomplished by stepwise rotating the target on an axis perpendicular to the direction of the radar beam. Discrete Fourier transformation of the sequence of phasors, measured at each step, results in a frequency spectrum which corresponds to the cross-range image. The calibration target is not being rotated. If its return signal is measured every time the test target rotates one step, it provides a check on the phase stability of the radar path length. If necessary, the calibration target phase can be used to correct the test target phase for changes due to path length instability.

It is highly advantageous to enhance a target signal by introducing target signal path length change by half a radar wavelength or odd multiples thereof to enable background and leakage signal suppression in a CW radar measurement range. While the technique outlined is particularly useful in CW radar measurement, where the target cannot otherwise be separated from background and leakage signals, the technique can also be used in a non-CW radar, where range resolution is insufficient to effect the separation.

In typical CW radar cross section measurement ranges, the suppression of background signals is achieved by making the background as little reflective as possible. Leakage signals are cancelled by adding a signal of equal amplitude and opposite phase in the receiver. Both procedures are cumbersome, but seem to be the only choice since target measurement platforms are usually built for target rotation and not for target translation.

Clearly, many modifications and variations of the present invention are possible in light of the above teachings and it is therefore understood, that within the inventive scope of the inventive concept, the invention may be practiced otherwise than specifically claimed.

What is claimed is:

1. In a radar system having means for transmitting a signal to a stationary target and means for receiving a signal scattered by said target in the presence of large background clutter and leakage between the radar transmitter and receiver, a method comprising:

mounting said target in a first position;

transmitting a first radar signal from said transmitter to said target, and receiving a first composite signal, said first composite signal representing a first return signal from said target and a return signal from said background clutter and said leakage between said transmitter and said receiver;

moving said target from said first position to a second position at a known distance from said first position to change the path length of said transmitted signal from said transmitting means to said target;

transmitting a second radar signal from said transmitter to said target, and receiving a second composite signal, said second composite signal representing a second return signal from said target and said return signal from said background clutter and said leakage between said transmitter and said receiver, said second return signal from said target being out of phase with said first return signal from said target; and subtracting said first composite signal from said second composite signal, whereby the signals representing said background clutter and said leakage are cancelled.

2. The method of claim 1 wherein said return signal from said background clutter and said return signal due to said leakage are unchanged between measurements at said first and second positions.

3. The method of claim 2 wherein said radar signal is continuous wave.

4. The method of claim 3 wherein said radar transmitter and receiver are at the same position.

5. The method of claim 3 wherein said radar transmitter and receiver are spaced apart.

6. The method of claim 1 wherein the sum pathlength of said transmitted and target return signal is changed by $\frac{1}{2}$ wavelength when said target is moved from said first position to said second position.

7. In a radar system having means for transmitting a signal to a test target and an adjacent calibration target, both said targets being initially fixed in space at the same distance from a radar transmitter and receiver, and both targets being in the presence of the same background clutter and leakage between the radar transmitter and receiver, a method comprising:

transmitting a first radar signal from said transmitter to both of said targets, and receiving a first return signal, moving said calibration target from a first position to a second position at a known distance from said first position;

transmitting a second radar signal from said transmitter to said targets, and receiving a second return signal;

moving said test target from said first position to a second position adjacent said calibration target;

transmitting a third radar signal from said transmitter to said targets, and receiving a third return signal;

subtracting said first return signal from said second return signal, whereby the signals representing test target, background clutter and leakage are cancelled, and a signal representing said calibration target signal is derived; and subtracting said second return signal from said third return signal, whereby the return signal representing said calibration target, background clutter and leakage are cancelled, and a signal representing the test target signal is derived.

8. The method of claim 7, wherein said radar transmitter and receiver are at the same location and wherein said second position is spaced along the radar beam, ¼ wavelength from said first position.

9. The method of claim 7, wherein said radar transmitter and receiver are spaced apart and wherein said second position is at a distance from said first position such that the signal pathlength increases or decreases by ½ wavelength.

10. The method of claim 7 wherein the scatter cross section of the calibration target is known, and wherein the scatter cross section of the test target is:

$$S_t = S_c(V_{TT}/V_{TC})^2.$$

where
- $S_t$ is the scatter cross section of the test target,
- $S_c$ is the known scatter cross section of the calibration target;
- $V_{TT}$ is the test target signal, and
- $V_{TC}$ is the calibration target signal.

11. A method of cancelling unwanted radar signals comprising the steps of:
- positioning a target in a first fixed position, said target being located in the presence of unwanted noise;
- transmitting a first radar signal from a radar transmitting means to said target, and receiving a first return signal from said target and said noise, said first return signal having a first round trip pathlength to said target;
- moving aid target to a second fixed position;
- transmitting a second radar signal from said radar transmitting means to said target positioned in said second fixed position, and receiving a second return signal from said target and said noise, said second signal having a second round trip pathlength to said target; and
- subtracting said first return signal from said second return signal.

12. The method of claim 11 wherein the difference in the pathlength of the first return signal and the pathlength of said second return signal is ½ wavelength.

* * * * *